R. BLUM.
Hand-Plow
No. 63,840. Patented Apr. 16, 1867.
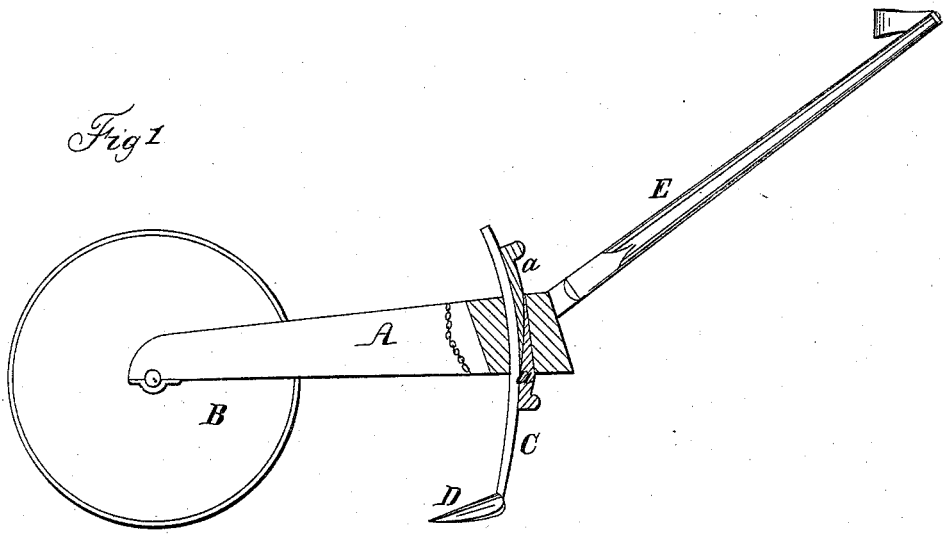
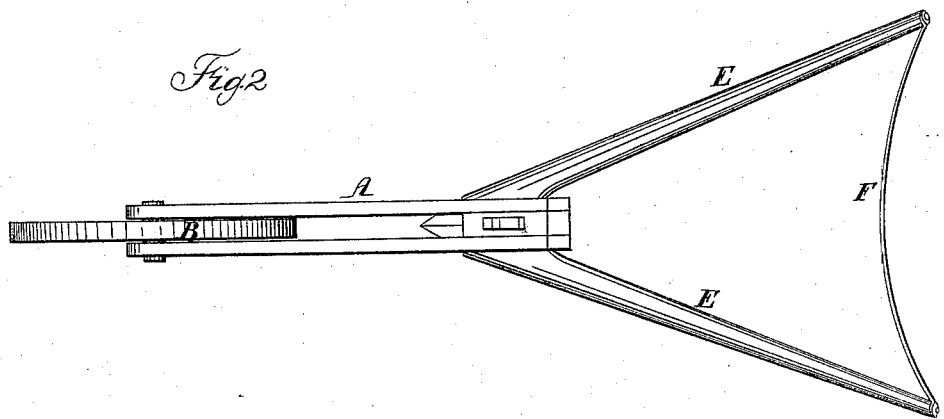
Witnesses.
P. T. Dodge
A. N. Marr
Inventor.
R. Blum
per
Alexander Mason
atty

United States Patent Office.

REINARD BLUM, OF CHAMPAIGN, ILLINOIS.

Letters Patent No. 63,840, dated April 16, 1867.

IMPROVEMENT IN HAND CULTIVATORS.

*The Schedule referred to in these Letters Patent and making part of the same.*

TO ALL WHOM IT MAY CONCERN:

Be it known that I, REINARD BLUM, of Champaign, in the county of Champaign, and State of Illinois, have invented certain new and useful improvements in "Hand Cultivator;" and do hereby declare that the following is a full, clear, and exact description thereof, reference being had to the accompanying drawings, and to the letters of reference marked thereon.

In the annexed drawings, making part of this specification, A represents the beam of the cultivator, which is made in the usual manner, and then slotted, as seen in fig. 2, or made of two pieces of board, separated, and secured at a proper distance. B represents a wheel, which supports the forward end of the beam. This wheel is placed in the slot or opening in the beam, and its axle is secured in proper boxes attached to the under side of the front or forward end of the beam. C represents a shank, to the lower end of which is connected the plough or cultivating tooth D. This shank runs up through a slot or opening in the rear end of the beam, and is secured at any desired point or at any desired angle by means of the wedges $a\ a$. E E represent the handles of the cultivator, which are made and secured to the beam A very similarly to the ordinary plough handles. These handles are connected together at their outer or rear ends by means of a strap, F.

In operating this cultivator, the breast of the operator is placed against the strap C, and the plough point or cultivating tooth is forced through the earth without the use of other power. The wheel B, carrying the forward end of the beam, prevents the point D from entering the ground too deep, and the operator, by taking hold of the handles E E, regulates the depth to which he desires or can force the point through the earth.

Having thus fully described my invention, what I claim as new, and desire to secure by Letters Patent, is—

The arrangement of the beam A, wheel B, shank C, provided with point or tooth D, with the handles E E, and strap F, for forming a hand cultivator, substantially as specified.

In testimony that I claim the foregoing I have hereunto set my hand and seal this 20th day of February, 1867.

REINARD BLUM.

Witnesses:
C. B. SMITH,
W. N. ORLIN,
E. D. GRAHILL.